United States Patent [19]
Moyer

[11] Patent Number: 5,529,549
[45] Date of Patent: Jun. 25, 1996

[54] HYBRID INTERNAL COMBUSTION ENGINE

[76] Inventor: David F. Moyer, 1110 Dorset Dr., West Chester, Pa. 19382-8008

[21] Appl. No.: 309,863

[22] Filed: Sep. 21, 1994

[51] Int. Cl.$^6$ ................................................. B60K 41/20
[52] U.S. Cl. ........................................ 477/189; 123/198 F
[58] Field of Search ......................... 477/189; 123/198 F, 123/481

[56]  References Cited

U.S. PATENT DOCUMENTS

| | | | |
|---|---|---|---|
| 3,576,239 | 4/1971 | Hajek | 477/189 |
| 3,886,810 | 6/1975 | Sugiyama. | |
| 4,351,409 | 9/1982 | Malik. | |
| 4,359,979 | 11/1982 | Dolza | 123/198 F |
| 4,414,936 | 11/1983 | Huff | 123/198 F |
| 4,470,390 | 9/1984 | Omori et al. | 123/198 F X |
| 4,590,767 | 5/1986 | Gardner, Jr. . | |
| 4,798,053 | 1/1989 | Chang . | |
| 4,945,870 | 8/1990 | Richeson . | |
| 5,123,397 | 6/1992 | Richeson . | |
| 5,284,116 | 2/1994 | Richeson, Jr. . | |
| 5,331,866 | 7/1994 | Voigert et al. | 123/198 F X |

Primary Examiner—Rodney H. Bonck
Assistant Examiner—Peter Kwon

[57] ABSTRACT

A method and apparatus for improving the fuel economy and reducing emissions of an internal combustion engine. A device is provided for controlling the energy conversion function of the engine by computer control of engine valves and distribution valves. This control provides for the normal engine operation by providing intake air and fuel and exhausting the products of combustion; it also provides for operating the engine as an air compressor and storing the compressed air in a reservoir; it also provides for operating the engine as an air motor utilizing the stored compressed air; it also provides a supercharged engine function by utilizing the stored compressed air.

8 Claims, 2 Drawing Sheets

HYBRID INTERNAL COMBUSTION ENGINE

FIELD OF THE INVENTION

The present invention relates to the field of internal combustion engines; more particularly to multi-functioned hybrid engines.

BACKGROUND OF THE INVENTION

This invention describes a method and apparatus for increasing the efficiency and reducing the undesirable emissions of an internal combustion engine. While the general principles and teachings hereinafter disclosed are applicable to all combustion engines, the invention is hereinafter described in detail in connection with its application to a reciprocating, fuel injected, compression ignited, internal combustion engine.

As used herein, the term "conventional engine" refers to a device which converts heat energy, released by the combustion of a fuel, into mechanical energy in a rotating output shaft of the engine. Also, the term "supercharged engine" refers to a conventional engine having the intake air pressurized above atmospheric pressure. Also, the term "disabled cylinder" is defined as having the intake and exhaust valves of one or more cylinders disabled so that they remain closed whether or not the camshaft is rotating. Also, the term "air compressor" is defined as using the engine to take energy from the load driven by the engine to compress air in the engine cylinders and then store it in a reservoir. Also, the term "air motor" is defined as powering the engine by the controlled release of compressed air into the engine cylinders.

In the United States, the law requires that passenger vehicles must be tested over an urban driving cycle and the fuel consumed and exhaust emissions generated determined. This driving cycle has many periods of acceleration, deceleration (including braking) and idle; with few periods of steady state speed. During deceleration and idle operation it is difficult to control emissions in the typical internal combustion engine—particularly throttled engines because of the low manifold pressures at these times. Also, fuel is consumed when the accelerator is released and no energy is required from the engine. The emissions measured during this test must be less than those specified by law at the time of manufacture, and the fuel consumed is used in the determination of the Corporate Average Fuel Economy (CAFE) during that year.

Two of the principle methods of meeting these laws is to reduce the vehicle's size, weight, and aerodynamic drag; and also to utilize computer control of the engine operating variables as described in my earlier U.S. Pat. No. 3,969,614 which is incorporated herein by reference. The present invention uses a controller to control the valve timing and air flow which changes the fundamental operation of the engine in order to reduce fuel consumption and emissions.

Many inventors have proposed using auxiliary equipment to absorb energy from the load during braking and returning this energy to the vehicle driveshaft during accelerations. One of these methods is illustrated in U.S. Pat. No. 3,886,810 (Sugiyama) and embodies a flywheel as the energy storage mechanism. The flywheel and associated control mechanisms are not a part of the fundamental internal combustion engine and the incremental cost and frictional losses of this auxiliary equipment are undesirable. My invention utilizes the pistons, valves, and cylinders of the conventional engine to perform the energy storage and release as well as increasing the efficiency of the engine itself.

Another proposal for saving the kinetic energy of the vehicle utilizes an elaboration of the automatic transmission as shown in U.S. Pat. No. 4,351,409 (Malik). This system uses a transmission modification to couple a hydraulic pump/motor to the driveshaft of the engine and stores energy in a compressed gas cylinder. Once again, the incremental cost and frictional losses of this auxiliary equipment are undesirable and no engine efficiency improvements such as described in my invention are found in this patent.

Another proposal for saving the kinetic energy of the vehicle utilizes a separate air motor coupled to the engine crankshaft through an electromagnetic clutch in U.S. Pat. No. 4,798,053 (Chang). This system causes uncontrolled braking when the accelerator pedal is released, the braking being dependent on the pressure in the storage tank, while my invention stores energy with controlled braking. The only engine efficiency improvement in this patent is the stopping of fuel flow when the accelerator is initially released, but the engine idles when the vehicle stops. My invention uses no fuel unless the accelerator is depressed and has other significant fuel savings.

A proposal for controlling the engine valves to improve the operating efficiency of the engine is found in U.S. Pat. Nos. 5,284,116, 5,123,397, and 4,945,870 (Richeson). This system controls the opening and closing times of electric intake and exhaust valves of an engine for the purpose of improving the cylinder burn conditions. It does not utilize any vehicle kinetic energy as described in my invention, nor does it disable valves to operate a multi-cylinder engine on less than all the cylinders such as described in my invention.

SUMMARY OF THE INVENTION

The main object of this invention is to improve the efficiency and reduce the emissions of a conventional internal combustion engine while powering a vehicle in normal operating conditions. A further object is to utilize the energy wasted as heat in braking a vehicle. A further object is to stop the fuel flow and emission generation while the accelerator pedal is released or the brake pedal depressed.

The method used by this invention to accomplish these objects is to control the number of cylinders consuming fuel in a multi-cylinder engine so that each cylinder will operate at its most efficient load; to raise the inlet air pressure which supercharges the cylinders and obtains greater power from the engine; to brake the vehicle by operating the engine as a compressor and storing the compressed air; to start the engine repeatedly by operating it as an air motor with the stored compressed air; and to stop all fuel flow and reduce engine drag while the accelerator is released or the brake depressed. This method uses a controller to determine valve action during each revolution of the engine in response to signals of accelerator position, brake pedal position, crankshaft position and other operating conditions.

The apparatus of the invention includes a conventional internal combustion engine, a controller (preferably a programmable digital computer), electrically controlled disablers for the engine valves, electrically controlled distribution valves, electrically controlled fuel injectors, sensors for accelerator position, brake pedal position, and crankshaft position, and compressed air storage means with sensors for its internal temperature and pressure.

The invention may be better understood by reference to the detailed description which follows and to the drawings.

This detailed description of the invention is an embodiment of the engine control system of the invention as it may be applied to a reciprocating, fuel injected, compression ignited, internal combustion engine. It should be understood, however, that the principles and approaches taken in connection with this particular type of engine are applicable to other types as well.

Figure 1:
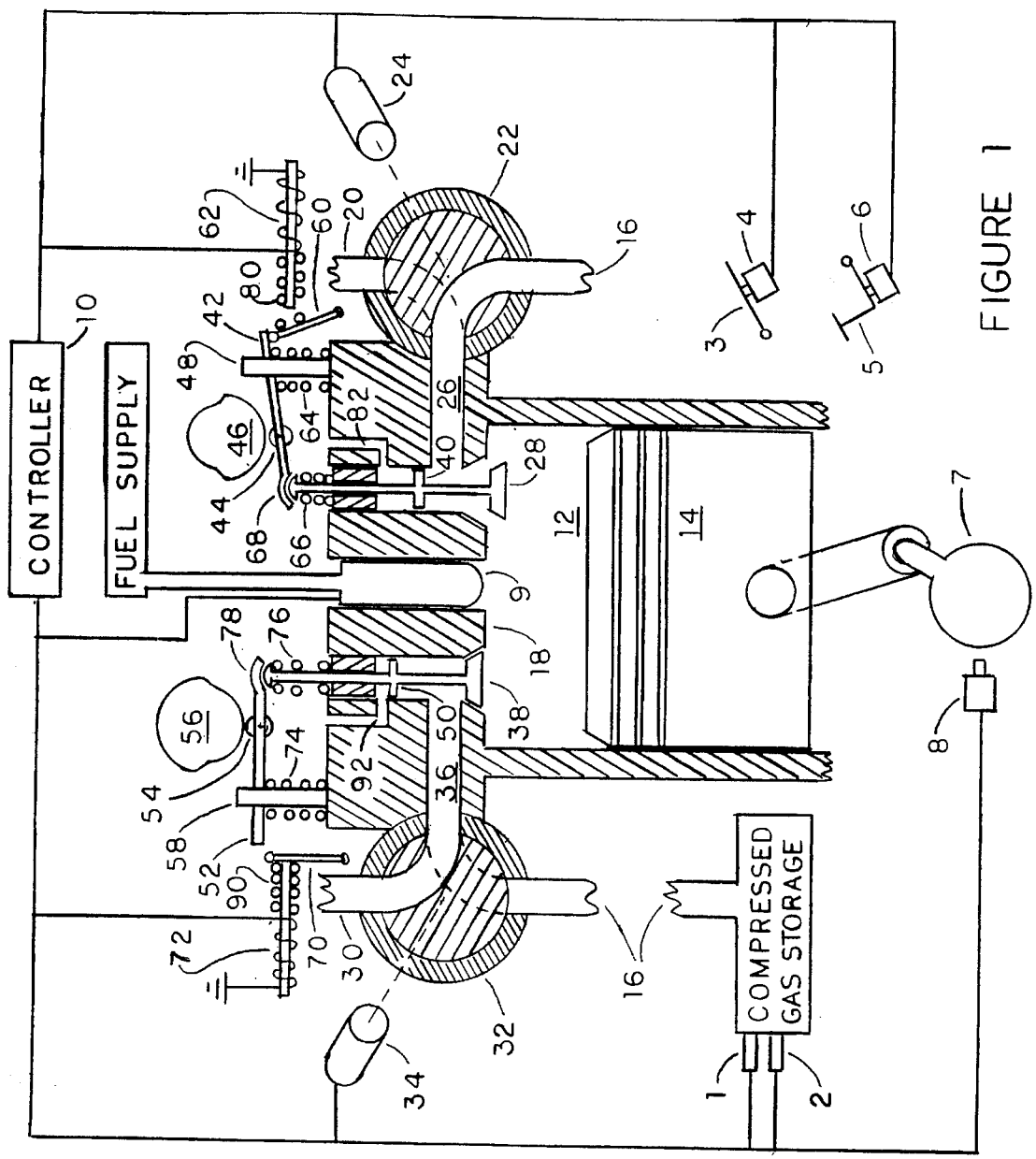
FIG. 1 is a schematic block diagram of the engine control system of a reciprocating, fuel Injected, compression ignited, internal combustion engine.
Figure 2:
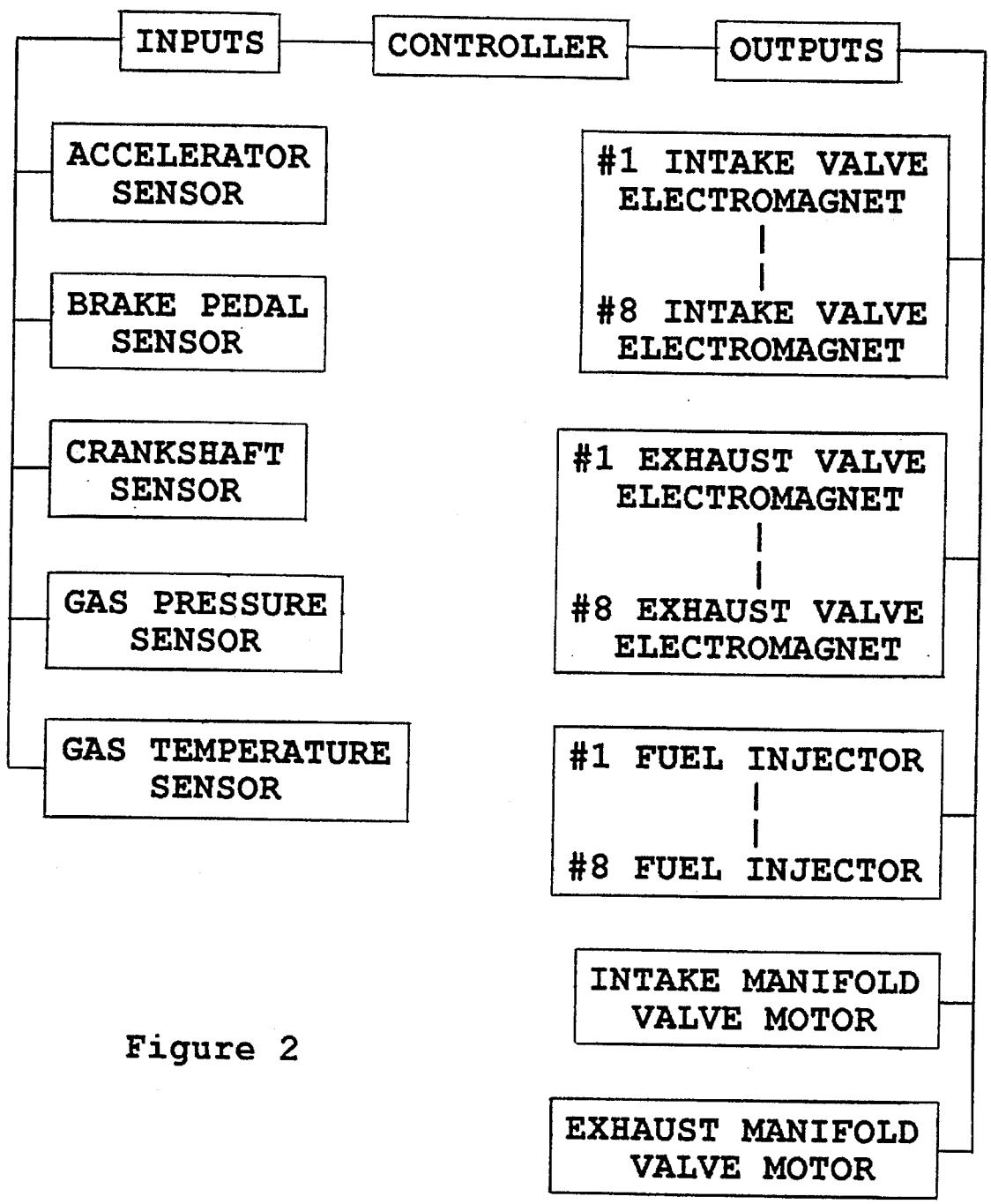
FIG. 2 is a block diagram of the system controller showing its inputs and outputs.

| REFERENCE NUMERAL LIST | |
|---|---|
| 01 gas temperature sensor | 02 gas pressure sensor |
| 03 accelerator pedal | 04 accelerator pedal sensor |
| 05 brake pedal | 06 brake pedal sensor |
| 07 crankshaft | 08 crankshaft sensor |
| 09 fuel injector | 10 controller |
| 12 cylinder | 14 piston |
| 16 pressure line | 18 cylinder head |
| 20 air supply line | 22 intake distribution valve |
| 24 intake stepper motor | 26 intake manifold |
| 28 intake valve | 30 exhaust line |
| 32 exhaust distribution valve | 34 exhaust stepper motor |
| 36 exhaust manifold | 38 exhaust valve |
| 40 intake disc | 42 intake cam follower |
| 44 intake roller | 46 intake camshaft |
| 48 intake follower guide | 50 exhaust disc |
| 52 exhaust cam follower | 54 exhaust roller |
| 56 exhaust camshaft | 58 exhaust follower guide |
| 60 intake disabler arm | 62 intake electromagnet |
| 64 intake guide spring | 66 intake valve spring |
| 68 intake follower indentation | 70 exhaust disabler arm |
| 72 exhaust electromagnet | 74 exhaust guide spring |
| 76 exhaust valve spring | 78 exhaust follower indentation |
| 80 intake disabler spring | 82 intake valve vent |
| 90 exhaust disabler spring | 92 exhaust valve vent |

DETAILED DESCRIPTION OF THE INVENTION

In the following description, the method and apparatus of the invention are embodied in an engine control system as applied to a 7.3 liter direct injection diesel V8 engine. This engine is similar to a 1994 Ford Motor Company 7.3 liter direct injection diesel except that there is no turbocharging and each engine valve is electrically controlled. In addition, the fuel injectors are electrically controlled. The camshafts for the valves have less overlap than normal and they rotate at crankshaft speed. The valves operate unless an electric signal is applied to disable them. In normal engine operation, the valves open every other engine revolution. In addition, there are two distribution valves controlled by electric stepping motors, one of which can connect the exhaust manifold to the exhaust line or, with a variable restriction, to the pressure tank, and the other of which can connect the intake manifold to the air supply line or, with a variable restriction, to the pressure tank.

The engine has five functional modes of operation: conventional engine, supercharged engine, disabled cylinder, air compressor, and air motor. These functional modes are described in the following five paragraphs:

Conventional Engine Function

The engine performs as a conventional four cycle internal combustion engine. Filtered air is admitted unrestricted to the intake manifold and exhaust flows unrestricted from the exhaust manifold to the tail pipe and muffler.

Supercharged Engine Function

The exhaust valve is operated normally (every other crankshaft revolution) and its output flows unrestricted through the exhaust manifold to the exhaust line. The intake valve is operated normally (every other crankshaft revolution) but its input comes from the pressure tank through a variable restriction in the intake distribution valve to control the amount of supercharging. This mode's time of operation is limited by the pressure tank capacity and is used primarily for accelerating the vehicle.

Disabled Cylinder Function

Both the intake and exhaust valves of the cylinder are disabled and remain closed, fuel flow to the cylinder is stopped, and the cylinder acts as an air spring, returning the energy on the expansion stroke which was absorbed on the compression stroke. There is very little engine drag when all the cylinders are simultaneously disabled.

Air Compressor Function

Both valves operate every crankshaft revolution. The intake valve is open while the cylinder volume is increasing, and gets filtered outside air unrestricted through the intake distribution valve. The exhaust valve is open while the cylinder volume is decreasing, and delivers the compressed air to the pressure tank through a variable restriction in the exhaust distribution valve to control the amount of braking.

Air Motor Function

Both valves operate every crankshaft revolution. The exhaust valve is open while the cylinder volume is decreasing, and delivers the exhaust air unrestricted through the exhaust distribution valve to the exhaust line. The intake valve is open while the cylinder volume is increasing and receives compressed air from the pressure tank through a variable restriction set by the intake distribution valve to control the acceleration of the engine. This mode's time of operation is limited by the pressure tank capacity and is used primarily for engine restarting (normally a few revolutions).

The pressure tank must be capable of storing air at a pressure equal to the compression in a cylinder, e.g. 270 pounds per square inch. It must also have a pressure relief valve to handle long periods of braking. In a motor vehicle, the frame may be constructed of tubing which could be used as a pressure tank to contain this modest pressure. A secondary pressure tank with suitable connecting valves may be used to increase the pressure in stages to much higher pressures if desired.

The method and apparatus of this invention are utilized to achieve the said objects by operating an engine driven vehicle in the following manner: The engine is sized so that conventional engine operation will maintain maximum vehicle speed on a level road. When less speed is required, the controller selectively disables some of the cylinders and maintains best brake specific fuel flow in the remaining cylinders while minimizing vibration by continuously changing the set of operating cylinders. The supercharged engine function may also be used to maintain the best fuel efficiency in the cylinders which are operating. When acceleration is required, a supercharged engine function is used to provide additional power while drawing compressed air from the pressure tank. When going downhill or coasting and the accelerator pedal is fully released, all cylinders are disabled and all fuel flow is stopped. When braking is required, the air compressor function is utilized and the brake pedal position determines the restriction in the exhaust manifold valve (and the resulting braking effort) while storing the compressed air. After the vehicle is stopped, the engine (which has also stopped) is restarted by utilizing the air motor function until the engine reaches idle speed, after which either the conventional or supercharged engine function is used depending on the accelerator position.

The controller, which may be a programmable digital computer, periodically receives and stores sensor values with which it calculates rate of change of the values with time (first derivative), and rate of rate of change of the values with time (second derivative) for each system condition measured by the sensor. Thus, the periodic measure of crankshaft position determines also its rotational speed and acceleration. With this information, the controller can send a signal to an engine valve control which enables that valve at a precise crankshaft position. The controller also has stored information of the engine characteristics, so that when operating information is compared to these characteristics, the optimum values can be determined and sent as electrical control signals to the engine valves, fuel injectors, intake distribution valve, and exhaust distribution valve.

With reference to the drawing, FIG. 1, there is shown a schematic block diagram of an engine control system embodying the method and apparatus of the invention. An internal combustion engine used for a vehicle may include a plurality of combustion chambers or cylinders 12, one of which is shown. A piston 14 is mounted for reciprocal motion within cylinder 12. Piston 14 is mechanically connected to a crankshaft 7 which transforms the reciprocal motion to rotary motion in the usual fashion. Also, in the usual fashion, the crankshaft is connected to the wheels of the vehicle through a transmission and differential (not shown). An accelerator pedal 3 and a brake pedal 5 are shown.

The input sensors for the controller 10 are: the stored gas temperature 1, the stored gas pressure 2, the accelerator 4, the brake 6, and the crankshaft 8. The devices operated by the outputs of controller 7 are: stepper motors 24 and 34, valve electromagnets 62 and 72, and fuel injector 9.

A filtered air supply line 20 is connected to the first port of a rotary intake distribution valve 22 positioned by an intake stepper motor 24. A pressure line 16 from a pressure tank is connected to the second port of valve 22. The intake manifold 26 is connected to the third port of valve 22. Stepper motor 24 can control valve 22 to adjustably connect with variable restriction line 20 to manifold 26 while sealing off line 16, or may adjustably connect with variable restriction line 16 to manifold 26 while sealing off line 20, or it may seal off line 20, line 16, and manifold 26.

The intake valve 28, housed within the cylinder head 18, has a disc 40 secured to the valve stem. Disc 40 offsets the pressure against the back of the valve 28 face when there is any pressure in manifold 26 and prevents this pressure from opening valve 28. The intake valve vent 82 relieves the pressure on the opposite side of disc 40.

The cam follower 42 has an indentation 68 at one end which nests with the end of the valve 28 stem, and a roller 44 which rolls against the camshaft 46 surface. A follower guide 48 and its spring 64 together with the valve spring 66 keeps roller 44 in contact with cam 46 and indentation 68 in contact with valve 28 stem when the electromagnet 62 for the disabler arm 60 is energized and valve 28 is disabled. In the disabled condition, when camshaft 46 rotates and forces roller 44 downward, spring 64 is depressed since its force is less than that of spring 66 and valve 28 does not move. When electromagnet 62 is de-energized valve 28 is enabled because the disabler spring 80 pushes arm 60 against follower 42 and prevents follower 42 from compressing spring 64. The path of disabler arm 60 under the action of spring 80 is such as to push follower 42 toward cam 46 thus keeping roller 44 in contact with cam 46 and indentation 68 in contact with valve 28 stem. In the enabled condition, when camshaft 46 rotates and forces roller 44 downward, valve 28 is opened. Intake valve 28 is shown enabled and open in FIG. 1.

The diesel fuel injector 9 supplies fuel to the cylinder 12 so long as a signal from the controller is present.

An exhaust line 30 is connected to the first port of a rotary exhaust distribution valve 32 positioned by an exhaust stepper motor 34. Line 16 from a pressure tank is connected to the second port of valve 32. The exhaust manifold 36 is connected to the third port of valve 32. Stepper motor 34 can control valve 32 to adjustably connect with variable restriction line 30 to manifold 36 while sealing off line 16, or may adjustably connect with variable restriction line 16 to manifold 36 while sealing off line 30, or it may seal off manifold 36, line 16, and line 30.

The exhaust valve 38, housed within cylinder head 18, has a disc 50 secured to the valve 38 stem. Disc 50 offsets the pressure against the back of the valve 38 face when there is any pressure in manifold 36 and prevents this pressure from opening valve 38. The exhaust valve vent 92 relieves the pressure on the opposite side of disc 50.

The cam follower 52 has an indentation 78 at one end which nests with the end of the valve 38 stem, and a roller 54 which rolls against the camshaft 56 surface. A follower guide 58 and its spring 74 together with the valve spring 76 keeps roller 54 in contact with camshaft 56 and indentation 78 in contact with the valve 38 stem when the electromagnet 72 for the disabler arm 70 is energized and valve 38 is disabled. In the disabled condition, when camshaft 56 rotates and forces roller 54 downward, spring 74 is depressed since its force is less than that of spring 76 and valve 38 does not move. When electromagnet 72 is de-energized, valve 38 is enabled because the disabler spring 90 pushes arm 70 against follower 52 and prevents follower 52 from compressing spring 74. The path of disabler arm 70 under the action of spring 90 is such as to push follower 52 toward cam 56 thus keeping roller 54 in contact with camshaft 56 and indentation 78 in contact with the valve 38 stem. In the enabled condition, when camshaft 56 rotates and forces roller 54 downward, valve 38 is opened. Exhaust valve 38 is shown disabled and closed in FIG. 1.

CONCLUSIONS, RAMIFICATIONS, AND SCOPE

It should be obvious to those skilled in the automotive arts that this invention will provide good drivability, better fuel economy, and less pollution than the present automobile engine. It should also be obvious that the expense of implementation will be low since most of the changes required for this invention are minor modifications of standard automotive parts. In particular, most tooling changes are minor, the additional computer program steps are simple and evident, and the additional parts required are inexpensive.

It should be noted that the engine valve mechanism described in this specification could as well be an electric or hydraulic valve, and this would increase the flexibility and efficiency of the engine by varying the overlap, timing, and duration of the valve action. This would, however, increase the implementation cost.

It should be further noted that the system would function, albeit with significantly less efficiency, without the valve disablers. This would sacrifice some of the brake specific fuel gains and store less energy because the compressor and motor action would take place every other engine revolution.

It should also be noted that the distribution valves need not be rotary valves operated by stepper motors as any valve mechanism having similar operating characteristics would suffice.

while the description of the invention is a specific embodiment in a diesel engine, it is obvious that a gasoline or any other internal combustion engine would obtain the same benefits of this invention. Therefore, the scope of this invention should be determined by the claims which follow.

Based on the forgoing description of the invention, what is claimed is:

1. A system for controlling an internal combustion engine coupled to an inertial load, said system comprising:
   said engine having operating means consisting of:
      taking said load kinetic energy from the said engine driveshaft and storing it as compressed gas and
      taking said energy from said stored gas and delivering it to
      said driveshaft;
   a control means which responds to an operator demand by providing signals to valves;
   a valve control means which responds to said signals by causing said engine to operate with appropriate functional means,
   said functional means comprising:
   conventional engine function,
   supercharged engine function,
   disabled cylinder function,
   air compressor function,
   air motor function,
   a compressed gas storage means.

2. A system as defined in claim 1 wherein said engine having said operating means for taking said stored energy and delivering it to said driveshaft with means for supplementing said energy with fuel energy.

3. A system as defined in claim 1, wherein said control means has a plurality of inputs and outputs, said inputs comprising:
   said operator demands,
   said engine operating conditions,
   said system conditions;
   said outputs comprising:
   said engine valve control signals
   distribution valve control signals
   fuel control signals.

4. A system as defined in claim 3, wherein said inputs are signals from sensors measuring device conditions, and said outputs are electrical signals for controlling system components, said conditions comprising:
   an accelerator pedal position,
   a brake pedal position,
   said engine crankshaft position,
   said distribution valves' positions,
   said storage means internal pressure and temperature;
   said components comprising:
   said engine valves,
   said distribution valves,
   fuel injectors.

5. A system as defined in claim 1 wherein said valve controls comprise:
   a cam follower with means at one end to maintain contact with the upper end of a popper valve stem, a means at the other end of the cam follower to be restrained by a disabler arm which is maintained in place by a spring when said electromagnet is not energized by said control means, a means between said ends to maintain contact with a camshaft surface, an adjustment means for said disabler arm by which all three said contacts are maintained until said electromagnet is energized, after which said popper valve remains closed regardless of the said cam position;
   an intake distribution valve which is set by said control means to simultaneously seal an air supply line, a pressure line, and an intake manifold, or adjustably connect with variable restriction said intake manifold to said pressure line while sealing said air supply line, or said intake manifold to said air supply line while sealing said pressure line;
   an exhaust distribution valve which is set by said control means to simultaneously seal an exhaust line, said pressure line, and an exhaust manifold, or adjustably connect with variable restriction said exhaust manifold to said pressure line while sealing said exhaust line, or said exhaust manifold to said exhaust line while sealing said pressure line.

6. A method for operating an internal combustion engine system in a functional mode which is responsive to an operator demand, comprising the steps of:
   a) periodically determining the positions of the accelerator pedal and the brake pedal, and
   b) periodically determining said system operating conditions, and
   c) if said positions or said conditions change, then selecting the proper functional mode from a predetermined set, said set comprising:
   conventional engine function,
   supercharged engine function,
   disabled cylinder function,
   air compressor function,
   air motor function, and
   d) operating said engine system in said selected mode in response to said positions and said conditions.

7. A method as defined in claim 6, wherein said operating conditions comprise:
   a crankshaft position,
   an intake distribution valve position,
   an exhaust distribution valve position,
   the stored compressed air temperature and pressure;
   said system operation comprising the steps of:
   a) periodically determining said brake pedal position and said accelerator pedal position, and
   b) periodically determining said operating conditions, and
   c) periodically comparing said positions and said operating conditions and their derivatives, with the stored engine characteristics, to determine the optimum values for said engine system controls, and
   d) setting said engine system controls to said optimum values in a timely manner.

8. A method as defined in claim 7 wherein said engine system controls comprise:
   engine valve disablers,
   intake distribution valve,
   exhaust distribution valve,
   fuel injectors.

* * * * *